(12) United States Patent
Nagaoka (10) Patent No.: US 6,621,587 B1
(45) Date of Patent: Sep. 16, 2003

(54) PRINTER CONTROL APPARATUS

(75) Inventor: Hiroshi Nagaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/210,471

(22) Filed: Dec. 14, 1998

(30) Foreign Application Priority Data

Dec. 18, 1997 (JP) .............................. 9-349417

(51) Int. Cl.⁷ .............................................. G06K 15/00
(52) U.S. Cl. ...................................... 358/1.14; 358/1.9
(58) Field of Search ................. 358/1.14, 1.9, 358/504, 406, 1.15, 1.13

(56) References Cited

U.S. PATENT DOCUMENTS

| | | | | |
|---|---|---|---|---|
| 5,751,923 A | * | 5/1998 | Matzuzawa | 395/114 |
| 5,852,744 A | * | 12/1998 | Agatone | 395/837 |
| 5,991,846 A | * | 11/1999 | Ooki | 710/241 |
| 6,015,241 A | * | 1/2000 | Wiklof | 400/578 |

FOREIGN PATENT DOCUMENTS

| | | | | |
|---|---|---|---|---|
| EP | 0721158 A1 | * | 10/1996 | G06F/3/12 |
| JP | 1-121921 | | 5/1989 | G06F/3/12 |
| JP | 2-110625 | | 4/1990 | G06F/3/12 |

OTHER PUBLICATIONS

3270 Print Emulation Centronics Interface 3 pages from www.epinions.com.*

* cited by examiner

Primary Examiner—Jerome Grant, II
(74) Attorney, Agent, or Firm—Staas & Halsey LLP

(57) ABSTRACT

A printer control apparatus includes a data table storing operating state values, of signal lines connected to a printer, corresponding to each of states in which the printer is to be maintained, a recognizing process for comparing actual operating state values of the signal lines connected to the printer and the operating state values stored in the data table and recognizing a state of the printer based on a comparison result, and a process for controlling the printer based on a recognition result obtained by the recognizing process.

13 Claims, 9 Drawing Sheets

| STATE OF PRINTER | SLCT | FAULT | PE | PRDY | BUSY | ACK |
|---|---|---|---|---|---|---|
| ON-LINE | 1 | 0 | 0 | 1 | 0 | 0 |
| OFF-LINE | 0 | 1 | 0 | 1 | 0 | 0 |
| NO PAPER | 0 | 1 | 1 | 1 | 0 | 0 |
| POWER OFF | 1 | 1 | 1 | 0 | 0 | 0 |

(OPERATING STATE SIGNAL VALUE)   (VALUE OF INFORMATION SIGNAL IN DATA TRANSMISSION)

FIG.2C

| STATE OF PRINTER | SLCT | FAULT | PE | PRDY | BUSY | ACK |
|---|---|---|---|---|---|---|
| ON-LINE | 1 | 1 | 0 | 0 | 0 | 0 |
| OFF-LINE | 1 | 0 | 0 | 0 | 0 | 0 |
| NO PAPER | 1 | 0 | 1 | 0 | 0 | 0 |
| POWER OFF | 1 | 1 | 1 | 0 | 0 | 0 |

(OPERATING STATE SIGNAL VALUE)   (VALUE OF INFORMATION SIGNAL IN DATA TRANSMISSION)

| STATE OF PRINTER | SLCT | FAULT | PE | PRDY | BUSY | ACK | UNUSED | UNUSED | HEXADECIMAL NUMBER |
|---|---|---|---|---|---|---|---|---|---|
| ON-LINE | 1 | 0 | 0 | 1 | 0 | 0 | 0 | 0 | 0×90 |
| OFF-LINE | 0 | 1 | 0 | 1 | 0 | 0 | 0 | 0 | 0×50 |
| NO PAPER | 0 | 1 | 1 | 1 | 0 | 0 | 0 | 0 | 0×70 |
| POWER OFF | 1 | 0 | 1 | 0 | 0 | 0 | 0 | 0 | 0×a0 |

1=high 0=low        (BINARY)

FIG.8

| STATE OF PRINTER | SLCT | FAULT | PE | PRDY | BUSY | ACK | UNUSED | UNUSED | HEXADECIMAL NUMBER |
|---|---|---|---|---|---|---|---|---|---|
| ON-LINE | 1 | 0 | 0 | 0 | 0 | 0 | 0 | 0 | 0×80 |
| OFF-LINE | 0 | 1 | 0 | 0 | 0 | 0 | 0 | 0 | 0×40 |
| NO PAPER | 0 | 1 | 1 | 0 | 0 | 0 | 0 | 0 | 0×60 |
| POWER OFF | 0 | 0 | 0 | 0 | 0 | 0 | 0 | 0 | 0×00 |

1=high  0=low      (BINARY)

| STATE OF PRINTER | SLCT | FAULT | PE | PRDY | BUSY | ACK | UNUSED | UNUSED | HEXADECIMAL NUMBER |
|---|---|---|---|---|---|---|---|---|---|
| ON-LINE | 0 | 1 | 0 | 1 | 0 | 0 | 0 | 0 | 0×50 |
| OFF-LINE | 1 | 0 | 0 | 1 | 0 | 0 | 0 | 0 | 0×90 |
| NO PAPER | 1 | 0 | 1 | 1 | 0 | 0 | 0 | 0 | 0×b0 |
| POWER OFF | 0 | 1 | 1 | 0 | 0 | 0 | 0 | 0 | 0×60 |

1=high  0=low

PRINTER CONTROL APPARATUS

BACKGROUND OF THE INVENTION

1. Field of the Invention

The present invention relates to a printer control apparatus, and more particularly to a printer control apparatus controlling an interface in a system connected with printers so that centronics printers having different specifications can be controlled.

2. Description of the Related Art

The standard of the centronics interface has not yet fixed so that various types can be allowed in development. Thus, now, the centronics interface is widely applied to various fields, such as fields of workstation and personal computer.

Figure 1:
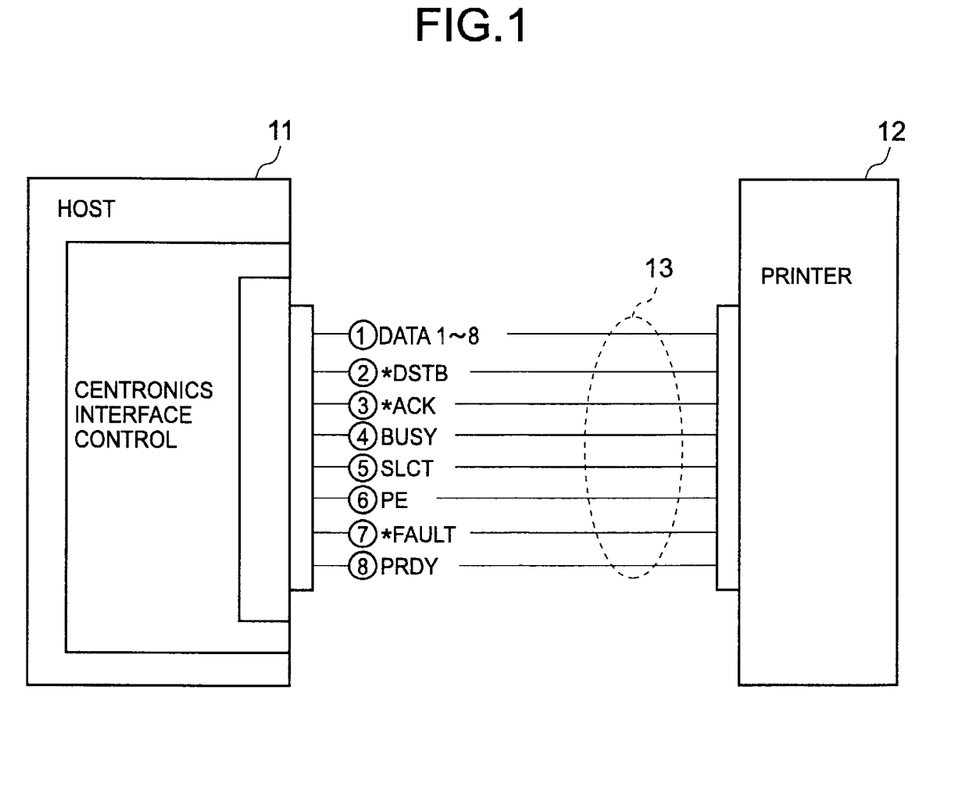
FIG. 1 is a diagram illustrating signal lines generally used in the centronics interface.

FIG. 1 shows signal lines generally used in the centronics interface. Referring to FIG. 1, a host apparatus 10 has an interface controller 11. The interface controller 11 is connected with a printer 12 by a printer cable 13. The printer cable 13 includes a data signal line ① and other signal lines ②-⑧ which are used to indicate states of the printer 12. Each of signals to which a mark * is added has a value of "0" in an active state. In general, the signal lines ②-⑧ indicate states of a specific printer. The respective signal lines indicate the following states. In many cases, either a BUSY signal or an ACK signal is used.

SLCT indicates that the printer is in an on-line state ("1" in the on-line state);

FULT indicates that the printer is in an off-line state ("1" in the off-line state);

PE indicates that the printer is in a state where there is no paper ("1" in a no paper state);

PRDY indicates a state of a power supply of the printer ("1" in an on state);

BUSY indicates that the printer is receiving data ("1" in a data receiving state); and ACK indicates that the printer has received data ("1" in a completed data reception state).

In the centronics interface, only the above signals may be defined. Meanings assigned to the signal lines depend on printers of respective manufacturers. Various control methods are used for printers of the respective manufacturers.

Thus, even if printers are based on the standard of the centronics, a single control program for the centronics interface may not correctly recognize states of the different types of printers.

Figure 2A:
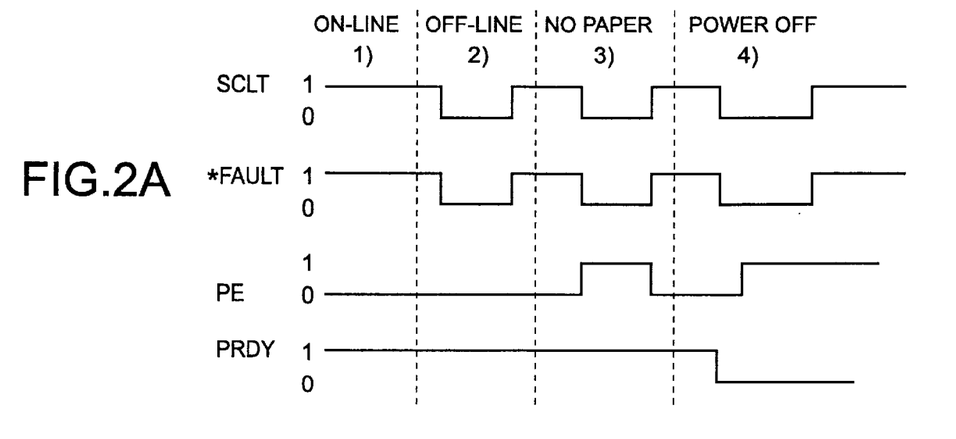
FIGS. 2A, 2B and 2C are diagrams illustrating relationships between operating state values of the centronics signal lines and states of a printer.
Figure 2B:
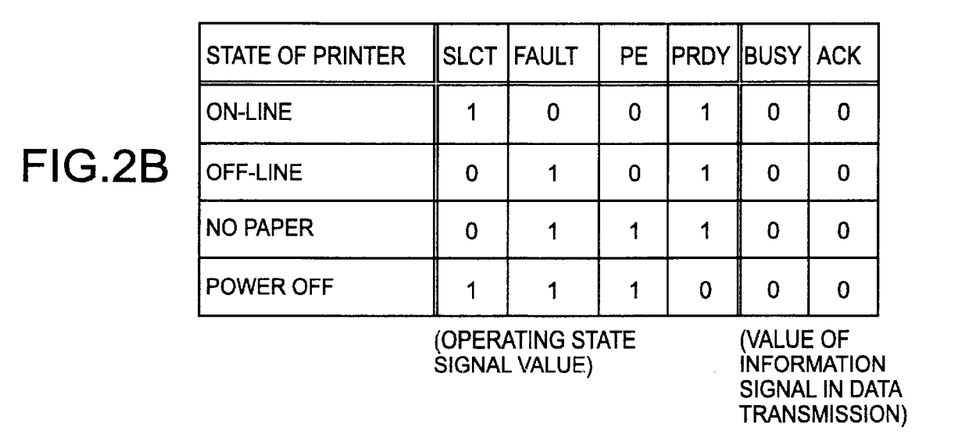

For example, the "on-line" state, the "off-line" state, the "no paper" state and the "power supply off" state are defined as states of a printer, and signals SELECT, *FAULT, PE and PRD (hereinafter the signals are referred to as centro-signals) are varied as shown in FIG. 2A. In this case, the centronics interface control program supporting the above printer can recognize the states of the printer based on relationships between operating state values and the states of the printer as shown in FIG. 2B.

Figure 2C:
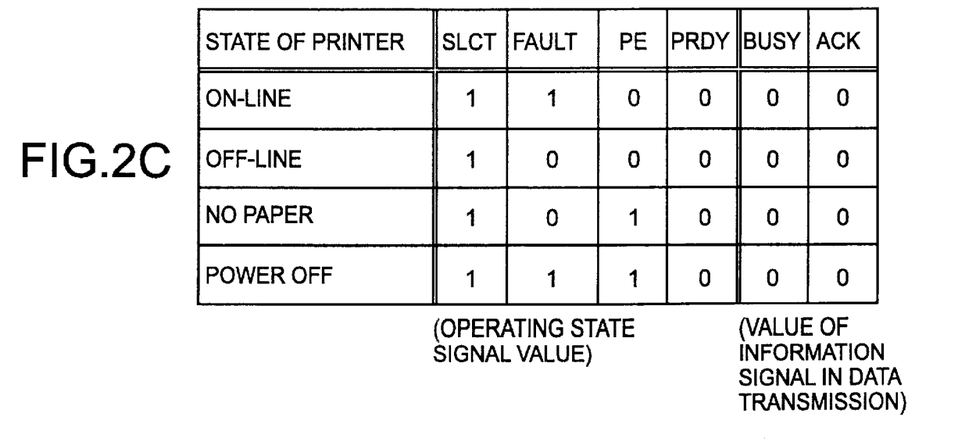

However, in a case of a printer for which relationships between operating state values and the states of the printer are formed as shown in FIG. 2C, the above centronics interface control program can not correctly recognize the states of the printer.

Since, as has been described above, various types of control methods are used for the centronics interface, every time a system is developed, an interface program for the system supporting a printer is developed.

That is, conventionally, it is necessary to change the centronics interface control program to support a printer in which sentro-signal lines may have different operating state values.

Figure 3:
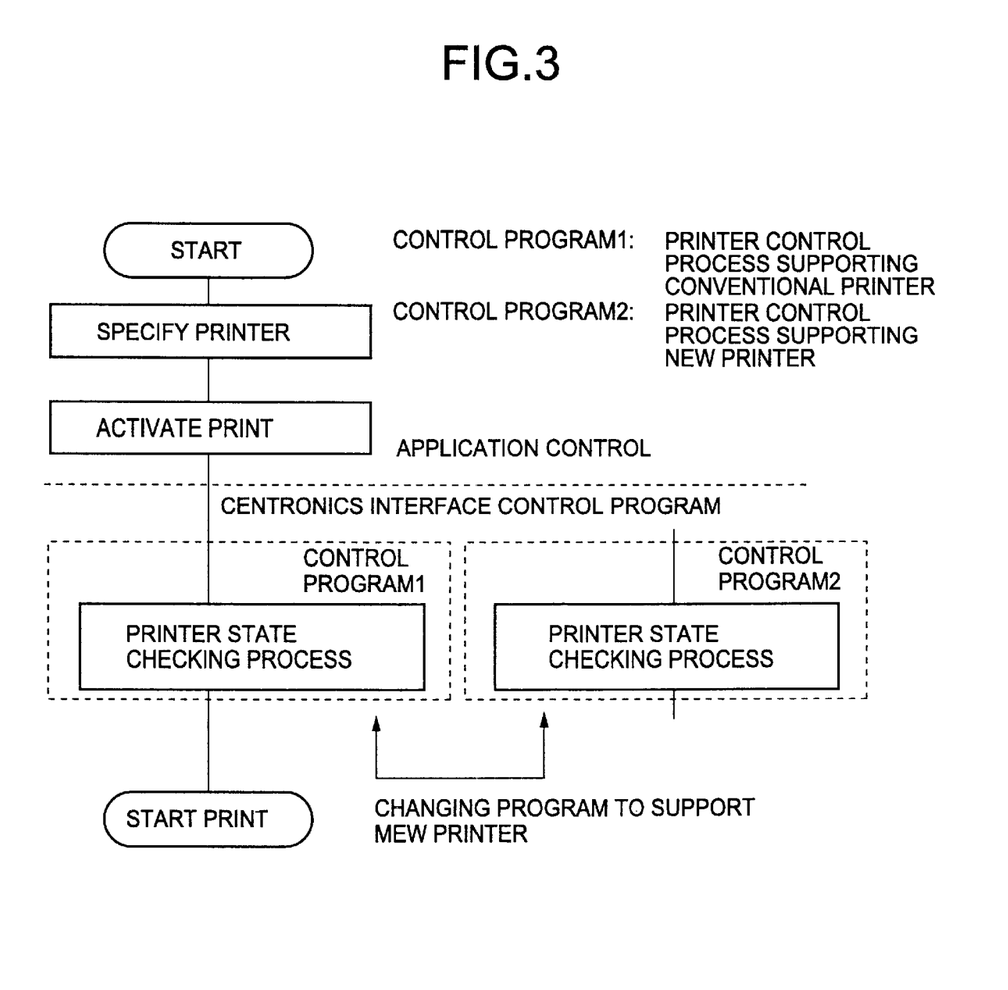
FIG. 3 is a diagram illustrating a process for supporting a new printer in a conventional system.

As shown in FIG. 3, in case of a system in which a centronics interface control program 1 is installed, in order to connect the system with a printer which is not supported by the control program 1, the control program 1 must be changed to a new centronics interface control program 2 which is developed to support the printer.

Therefore, the cost for the development of the control program is increased. In addition, in a case where the control program is changed to the new centronics interface control program 2, the previous printer is not used. Users use only limited types of printers supported by a single centronics interface control program.

SUMMARY OF THE INVENTION

Accordingly, a general object of the present invention is to provide a printer control apparatus in which the disadvantages of the aforementioned prior art are eliminated.

A specific object of the present invention is to provide a printer control apparatus capable of supporting different types of printers in which operating state values of the centro signal lines differ from each other.

The above objects of the present invention are achieved by a printer control apparatus comprising: a data table storing operating state values, of signal lines connected to a printer, corresponding to each of states in which the printer is to be maintained; recognizing means for comparing actual operating state values of the signal lines connected to the printer and the operating state values stored in the data table and recognizing a state of the printer based on a comparison result; and means for controlling the printer based on a recognition result obtained by the recognizing means.

According to the present invention, by only rewriting contents of the data table, another type of printer can be controlled. In a case where the printer control apparatus is implemented using a control program, another type of printer can be controlled without changing the control program. Thus, a system (the control program) which can control various types of printers can be developed without consideration of all the types of printers.

Contents of the data table may be set in accordance with a command from an application program. In this case, by user operations applying the application program, the apparatus can support a new type of printer.

In addition, the printer apparatus may further comprises storage means for storing relationships between identification information items identifying a plurality of printers and a plurality of sets of operating state values of signal lines to be connected to the plurality of printers, each sets of the plurality of operating state values corresponding to one of the plurality of printers; and setting means for, when a printer is specified using an identification information item, for selecting a set of operating values corresponding to a printer specified using the identification information from among the plurality of sets of operating state values in the storage means and setting the selected set of operating values in the data table.

In this case, by only specifying an identification information item corresponding to a new type of printer, the apparatus can control the new type of printer with reference to the data table.

BRIEF DESCRIPTION OF THE DRAWINGS

Other objects, features and advantages of the present invention will be apparent from the following description when read in conjunction with the accompanying drawings, in which.

DESCRIPTION OF THE PREFERRED EMBODIMENTS

A description will now be given, with reference to FIG. 4, of the principle of a printer control apparatus according to an embodiment of the present invention.

Figure 4:
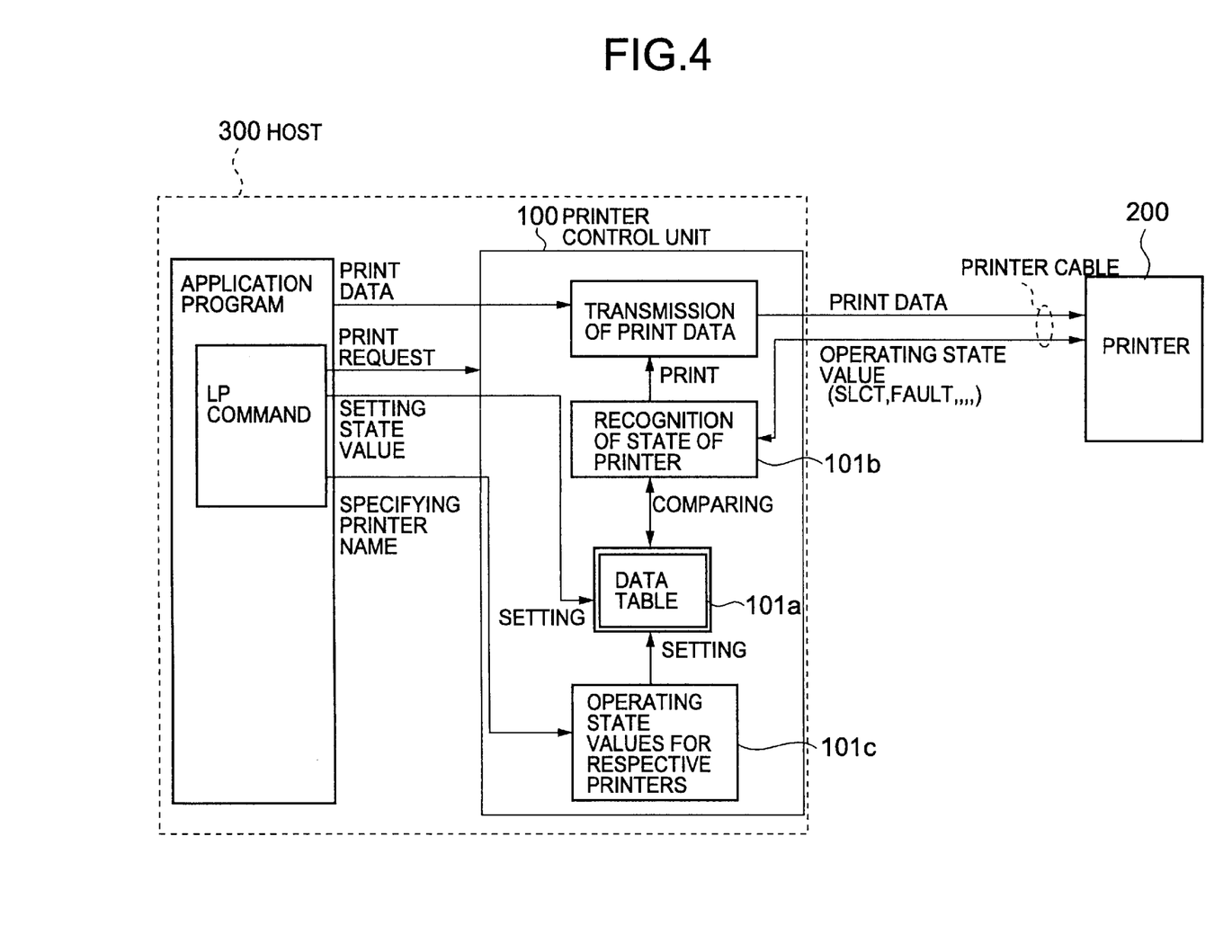
FIG. 4 is a block diagram illustrating the principle of a printer control apparatus according to an embodiment of the present invention.

Referring to FIG. 4, a printer control unit 100 is provided with a data table 101a. In the data table 101a, operating state value data (SLCT, FAULT . . . ) of signal lines connected to a printer 200 and states (the on-line state, off-line state, . . . ) of the printer 200 are set so as to correspond to each other.

When a print request issued by an application program 300, the printer control unit 100 compares operating state values of the signal lines and the operating state value data in the data table 101a with each other so as to recognize states of the printers 200 (101b). If the printer 200 is in a state where print can be performed, the printer control unit 100 transmits print data to the printer 200 and starts a printing process.

Due to the above structure, various types of printers based on different specifications can be supported by only changing the data table 101a.

In addition, the application program 300 may issue a command to set operating state value data in the data table 101a. In this case, a new printer can be supported by an user setting operation.

Further, a printer name of a generally used printer based on the centronics standard, the operating state value data of the signal lines of the printer and corresponding states of the printer are stored. When the application program 300 specifies a printer, data 101c corresponding to the specified printer is set in the data table 101a. In this case, even if a user does not know the specification of the printer connected to the system, the printer can be caused to correspond to the generally used printer.

A description will now be given of an embodiment of the present invention.

Figure 5:
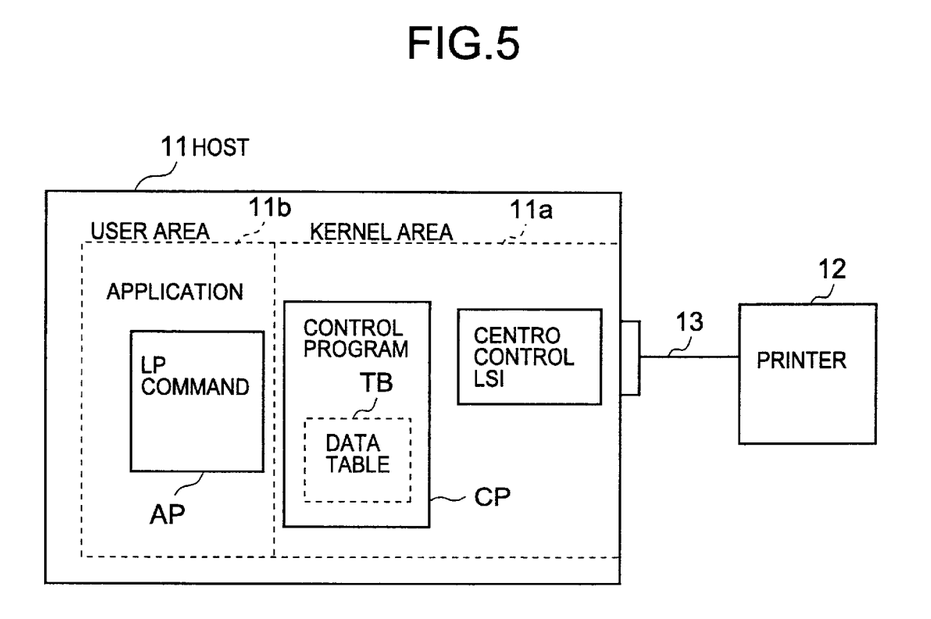
FIG. 5 is a block diagram roughly illustrating a printer control apparatus according to an embodiment of the present invention.

A system according to an embodiment of the present invention is roughly formed as shown in FIG. 5. Referring to FIG. 5, a host computer 11 is connected with a printer 12 by a printer cable 13. The host computer 11 provided with a user area 11a and a kernel area 11b. In the user area 11, an application program AP is stored. In the kernel area 11b, a centronics interface control program (hereinafter, referred to as a control program) CP is stored. In addition, the kernel area 11b is provided a centro-printer control LSI for performing a centronics interface control. The centro-printer control LSI is coupled to the centro-printer 12 (hereinafter, referred to as the printer 12) via the printer cable 13.

The control program CP is provided with a data table TB which is rewritable and used to recognize the states of the printer 12. When a print request command is issued by the application program AP, the control program CP compares operating state values of the centro-signal lines and the data set in the data table so as to recognize the states of the printer 12. If the printer is in a state where print can be performed, the control program CP transmits print data to the printer 12.

When the control program CP is developed data depending on printers supported by the system is written in the data table TB described above. In addition, the application program AP may issue a command to the control program to change the contents of the data table TB.

Figure 6:
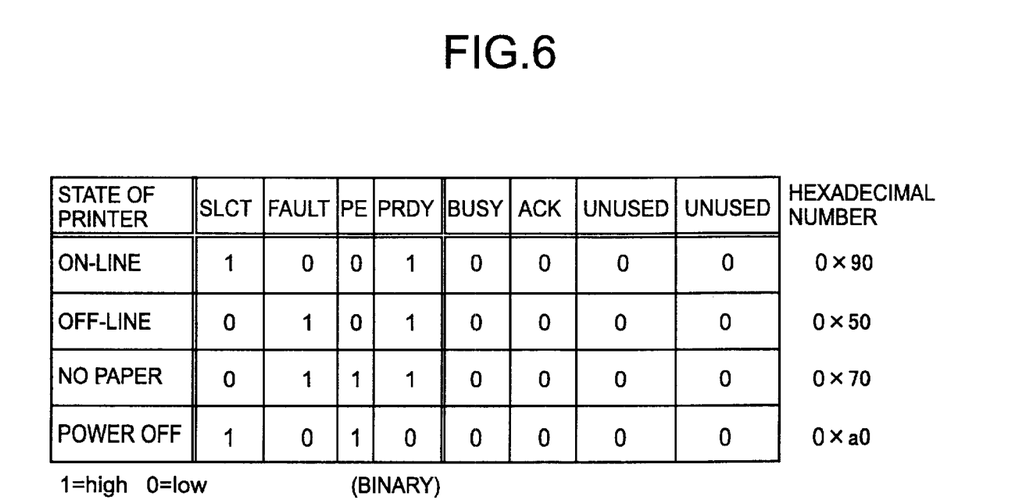
FIG. 6 is a diagram illustrating a data table TB used in the printer control apparatus shown in FIG. 5.

The data table TB is formed as shown in FIG. 6. Referring to FIG. 6, the data table TB is provided with values (operating state values) of the signal lines SLCT, FAULT, . . . , and ACK in the respective states of the "on-line" state, the "off-line" state, . . . , the "power off" state of the printer supported by the control program. Each of the sates of the printer is represented by one byte data. In the case show in FIG. 6, when the printer is in the "on-line" state, the values are set as SLCT=1, FAULT=0, PE=0, PRDY=1, BUSY=0 and ACK=0 and other two bits are not used (usually set to "0"). That is, in the case shown in FIG. 6, the "on-line" state is represented by a hexadecimal number of "0x90". In the same way, the "off-line" state, the "no paper" state and the "power off" state are respectively represented by hexadecimal numbers of "0x50", "0x70" and "0xa0". In the FIG. 6, "1" means that the signal line is in a high level state and "0" means that the signal line is in a low level state.

Figure 7:
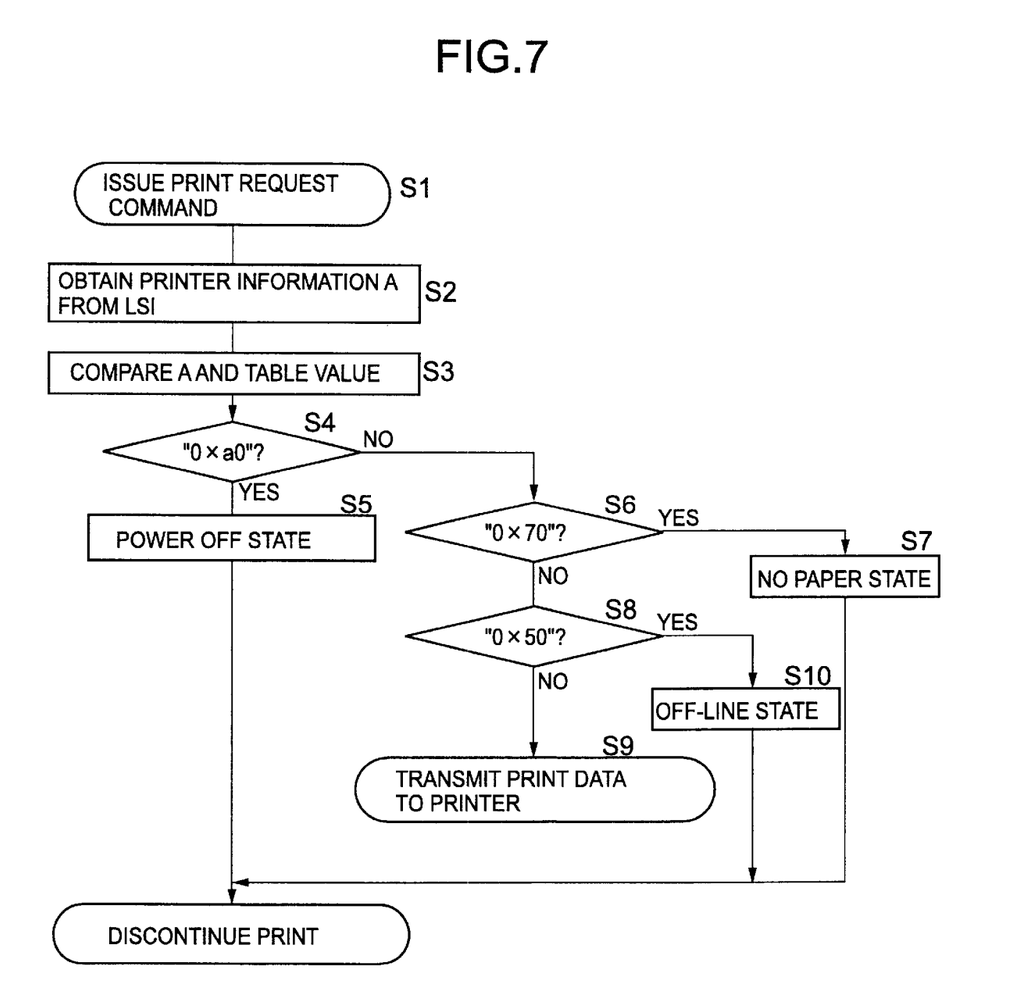
FIG. 7 is flowchart illustrating a procedure of a process executed by the printer control apparatus according to the embodiment of the present invention.

The control program CP executes a process in accordance to a procedure as shown in FIG. 7. FIG. 7 shows the procedure of the process in a case where the data table TB is provided with the data shown in FIG. 6.

Referring to FIG. 7, when the application program AP issues a print request command using an LP command, the control program CP receives printer information A (the states of the signal lines SLCT, FAULT . . . , and ACK) from the centro-printer control LSI (steps S1 and S2).

With reference to the data table TB shown in FIG. 6, the printer information A and the values in the data table TB are then compared with each other (step S3). It is determined whether the printer information A is equal to "0xa0" (representing the "power off" state shown in FIG. 6: "10100000") (step S4).

If the printer information A is equal to "0xa0", it is recognized that the printer 12 is in the power off state and the print is discontinued (step S5).

On the other hand, if the printer information A is not equal to "0xa0", it is determined whether the printer information A is equal to "0x70" (representing the "no paper" state shown in FIG. 6: "01110000") (step S6).

If the printer information A is equal to "0x70", it is recognized that the printer 12 in the no paper state and the print is discontinued (step S7). On the other hand, if the printer information A is not equal to "0x70", it is determined whether the printer information A is equal to "0x50" (representing the "off-line" state shown in FIG. 6: "01010000") (step S8).

If the printer information A is equal to "0x50", it is recognized that the printer 12 is in the off-line state and the print is discontinued (step S10). On the other hand, if the printer information is not "0x50", the control program CP transmits print data to the printer 12 via the centro-printer control LSI and the printer cable 13 (step S9). The print process is then executed.

In a case where the printer outputting signals SLCT, FAULT, PE and PRDY as shown in FIG. 6 is connected to the system, the control program CP can recognize the respective states, the "on-line" sates, the "off-line" states, the "no paper" state and the "power off" state. There may be printers in which the PRDY signal indicating the power supply is not used and printers in which the relationship between the SLCT signal and the FAULT signal is reversed.

However, in the printers developed using the general centronics interface, even if there is an unused line, operating state values of the different signal lines are not equal to each other. For example, there is no case where operating state values corresponding to the "no paper" state and the "power off" state are equal to each other. Therefore, the state of the printer can be recognized based on a pattern of all operating state values of used signal lines.

Thus, in order that the above control program CP supports a printer in which the PRDY signal is not used, data corresponding to the printer is written in the data table TB so that the states, the "on-line" state, the "off-line" state, the "no paper" state and the "power on" state, can be recognized.

A description will now be given of a case where a special printer in which the PRDY signal is not used is supported.

(1)—control of a printer which does not inform of the state of the PRDY signal indicating the state of the power supply—

In a case of a printer which does not inform of the state of the PRDY signal, the value of the PRDY signal is always equal to "0". Thus, if the control program CP recognizes the state of the printer with reference to the data table TB shown in FIG. 6, it may be determined that the power supply is in the off state although the power supply is actually in the on state.

Thus, in a case where the system is connected with such a printer, the state of the power supply is determined based a set of values of the SLCT, FAULT and PE signals, not the value of the PRDY signal, as follows.

Figure 8:
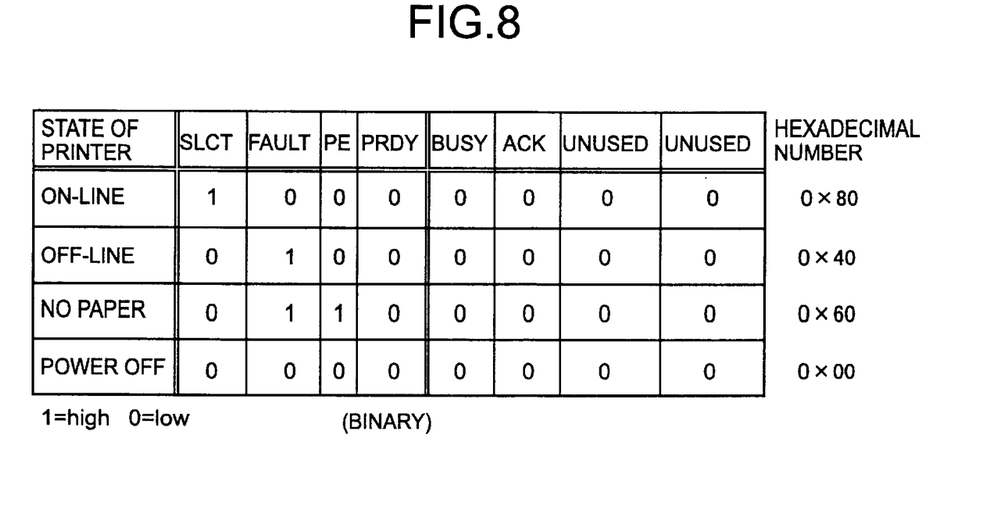
FIG. 8 is a diagram illustrating an example of a data table used in a case where a PRDY signal is not informed.

(a) In a case where a printer in which the respective states are represented as follows is controlled, values are written in the data table TB as shown in FIG. 8 and the state of the printer is recognized with reference to the data table.

It is not informed that the power supply is turned off (the PRDY is always equal to "0"). In the "on-line" state, SLCT=1 and other signals have "0". In the "off line" state, FAULT=1 and other signals have "0". In the "no paper" state, FAULT=1 and PE=1 and other signals have "0". In the "power off" state, SLCT=0, FAULT=0 and PE=0.

In the above case, the "on-line" state is represented by "0x80;

the "off-line" state is represented by "0x40";

the "on paper" state is represented by "0x60"; and the "power off" state is represented by "0x00".

Figure 9:
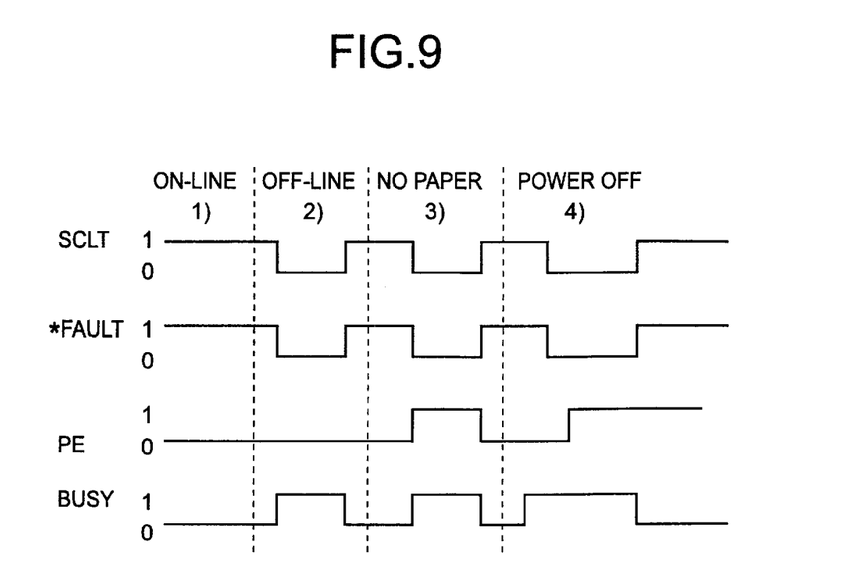
FIG. 9 is a diagram illustrating another example of operating state values in the printer which does not inform of the PRDY signal.

Using the data table shown in FIG. 8, the control program CP can recognize that the power supply is in the off state, so that the printer which does not inform of the state of the PRDY signal can be controlled.

b) There is a printer in which the respective sates are represented as shown in FIG. 9.

Referring to FIG. 9, it is not informed that the power supply is turned off (the PRDY is always equal to "0"). In the "on-line" state, SLCT=1 and FAULT=1 and other signals have "0". In the "off-line" state, BUSY=1 and other signals have "0". In the "no paper" state, PE=1 and BUSY=1 and other signals have "0". In the "power off" state, SLCT=1, FAULT=1, PE=1 and BUSY=1.

In a case where the above printer is controlled, values are written in the data table TB as follows.

The "on-line" state is represented by "0xc0";

The "off-line" state is represented by "0x08";

The "no paper" state is represented by "0x68"; and

The "power off" state is represented by "0xe0).

Using the data table TB in which the values are written as described above, the control program CP can recognize that the power supply is in the off state, so that the printer which does not inform of the "power off" state can be controlled.

As has been described above, the data corresponding to the specification of a printer is written in the data table TB, so that the control program CT can recognize that the power supply of the printer is in the off state. That is, without changing the control program CT, by only rewriting the data table, the control program CT can support the printer which does not inform of the "power off" sate.

(2)—control of a printer which does not inform of the state of the PE indicating a sate where there is no paper in the printer—

In a case where a printer which does not inform of the state of the PE signal, also, the control program CT can recognize the state of the printer based on a pattern of all operating state values of the signal lines, in the same manner as in the case of the printer which does not inform of the "power off" state.

That is, in the same manner as in the above case, data corresponding to the specification of a printer to be supported is written in the data table TB, and "no paper" state is recognized based on a set of vales of SLCT, FAULT, PRDY, PE and BUSY.

(3)—control of a printer in which the relationship between SLCT and FAULT is reversed—

For example, as to a printer in which the respective states are represented as follows, the on-line state can not recognized using the data table TB as shown in FIG. 6 or 8.

In the "on-line" state, SLCT=0, FAULT=1, PE=0 and PRDY=1. In the "off-line" state, SLCT=1, FAULT=0, PE=0 and PRDY=1.

Figure 10:
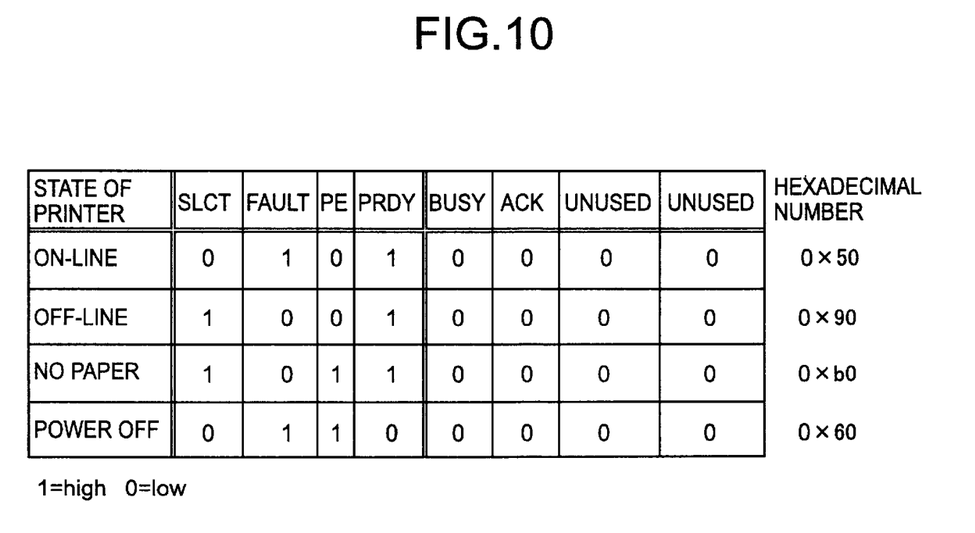
FIG. 10 is a diagram illustrating an example of a data table used in a case of a printer in which the SLCT does not have a value of "1" in the on-line state.
Figure 11:
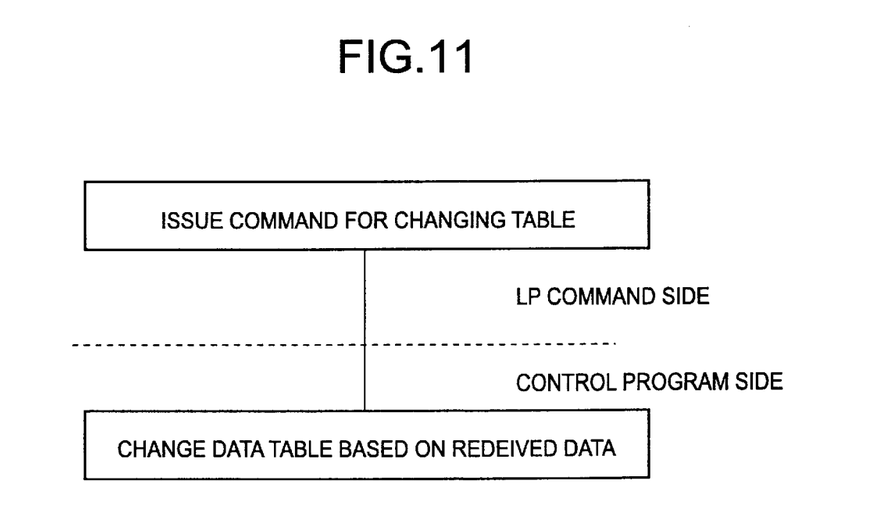
FIG. 11 is a flowchart illustrating a process in a case where the data table TB is set by an application program.

Thus, to correctly recognize the state of the above printer, data is written in the data table TB as shown in FIG. 10.

Using the data table as shown in FIG. 10, the control program CP can recognize that the printer is in the "on-line" state.

The data table TB is provided with data in accordance with the specifications of a type of printer to be supported when the control program is developed. In addition, the operating state value data may be set in the data table TB based on the command issued by the application program AP.

In a case where the data table TB is set by the application program, a command changing the data table is issued to the control program CP from an LP command side (the application program side). This command is added with data (e.g., represented by a hexadecimal number) to be written in the data table TB as an argument.

In the control program CP side, when receiving the data, the data table TB is changed based on the received data.

Since the user does not necessarily know about the specification of the printer well, the user may not specify data to be written in the data table TB.

Thus, centro-signal values for various types of printers which are generally provided by respective manufacturers as printers based on the centronics interface standard are previously stored in a storage unit. The user specifies a printer name from the application program and the command for changing the data table TB is issued. In response to the command, the control program CP selects data corresponding the specified printer name and the selected data is written in the data tale TB. The printer is controlled using the data table TB in which the selected are written as described above.

Figure 12:
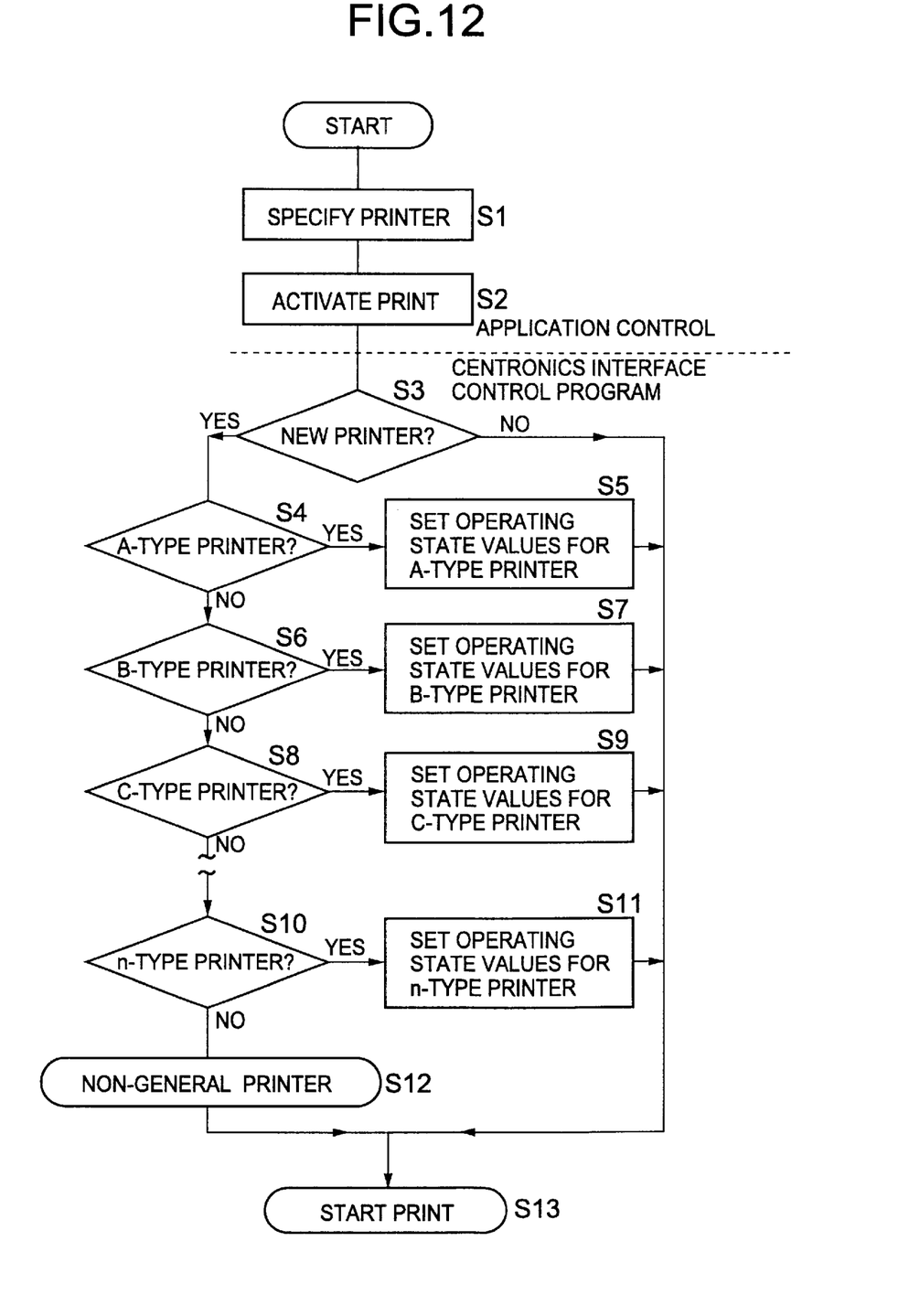
FIG. 12 is a flowchart illustrating a procedure of a process in a case where a plurality of types of centronics printers are controlled by specifying a printer name.

The process described above is carried out in accordance with a procedure as shown in FIG. 12.

Referring to FIG. 12, a printer to be connected is specified by the application program and a print operation is activated by the LP command (steps S1 and S2). The control program CP then determines whether the specified printer is a new type of printer (step S3). When the specified printer is not a new type of printer, the state of the printer can be recognized by the operating state values which have been set already set in the data table TB. Thus, with reference to the data table TB, the state of the printer is recognized based on operating state values of the signal lines connected to the printer. If the printer is in a state where prints are allowed, the control program CP transmits print data to the printer and the printing process is started.

On the other hand, if the printer is a new type of printer, it is first determined whether the specified printer is an A-type printer (e.g., a printer of an A corporation) (step S4). If the specified printer is the A-type printer, the operating state values which has been already stored for the A-type printer in the storage unit is read out from the storage unit. The operating state values are then set in the data table TB (step S5).

With reference to the data table TB which is rewritten as described above, the state of the printer is then recognized based on the state values of the signal lines connected to the printer. If the printer is in a state where prints are allowed, the control program CP transmits print data to the printer and the printing process is started.

If the specified printer is not the A-type printer, it is determined whether the specified printer is a B-type printer (e.g., a printer of a B corporation). If the specified printer is the B-type, the operating state values which has been already stored for the B-type printer in the storage unit is read out from the storage unit. The operating state values are set in the data table TB (steps S6 and S7).

With reference to the data table TB which is updated as described above, the state of the printer is then recognized based on the state values of the signal lines connected to the printer. If the printer is in a state where prints are allowed, the control program CP transmits print data to the printer and the printing process is started.

Hereinafter, in the same manner as in the above cases, if the operating state values for a specified printer has been already stored in the storage unit, the operating state value is set in the data table TB and the state of the printer is recognized using the rewritten data table TB (steps S8–S11). After this, thee printing process is started.

On the other hand, when the specified printer is not a general type of printer and the operating state values for such a printer have not yet stored in the storage unit, the state of the printer is recognized based on the operating state values which have been already set in the data table TB, and the printing process is started. In this case, the operations of the printer can not be guaranteed. Thus, a message to the effect that the operations of the printer can not be guaranteed is displayed.

According to the present embodiment, printers which were not supported in the conventional case can be supported as follows.

① Even if a printer which does not inform of the power off state, due to writing data in accordance with the specification of the printer in the data table TB, the control program CP which is not changed can support the printer.

Even if a printer which does not inform of the no paper state, in the same manner as above, due to writing data in accordance with the specification of the printer in the data table TB, the control program CP which is not changed can support the printer.

In addition, even if a printer which is in the on-line state when the SLCT signal is "0", due to writing data in accordance with the specification of the printer in the data table TB, the control program CP which is not changed can support the printer.

② Conventionally, in a case where a system provided with a control program CP having no function for recognizing the power off state, the no paper state and the like is connected with a printer which informs of the power off state, the no paper state and the like, the power off state of the printer can not be recognized. However, in the system according to the present embodiment, the control program CP can control such various types of printers by only rewriting the data in the data table TB.

In addition, conventionally, in a case where a system provided with a control program CP having no function for recognizing the SLCT signal is connected with a printer which informs of the on-line/off-line states, the on-line/off line states of the printer can not be recognized. However, in the system according to the present embodiment, the control program CP can control such a printer by only rewriting the data in the data table TB.

③ The application program issues a command and can rewrite data in the data table TB used by the control program. Thus, the user can rewrite the data in the data table so that the data is in accordance with the specification of the printer to be connected.

In addition, data indicating the relationships between the centro-operating state values for various types of printers which are generally provided by respective manufacturers as printers based on the centronics interface standard and the sates of the printers is stored in the storage unit. When a user specifies a printer name, the control program CP selects operating state values corresponding to the specified printer from among the operating state values in the storage unit.

The selected operating state values are then set in the data table TB. The specified printer is controlled using the data table in which the selected operating state values are set. Even if the user does not know the specification of the printer connected to the system, the control program can support the printer.

The present invention is not limited to the aforementioned embodiments, and other variations and modifications may be made without departing from the scope of the claimed invention.

The present application is based on Japanese priority application No.9-349417 filed on Dec. 18, 1997, the entire contents of which are hereby incorporated by reference.

What is claimed is:

1. A printer control apparatus comprising:
   a data table storing potential operating state values, which can be externally changed, of signal lines of a parallel printer cable connected to both a first printer and a parallel interface, the state values corresponding to each of states in which said first printer is to be maintained, where a control program controls the first printer through the parallel interface and the parallel cable;
   a recognizing unit comparing a set of actual operating state values of the signal lines of the parallel printer cable and read from the parallel interface, with a set of the potential operating state values stored in said data table, and recognizing a state of said first printer based on a result of the comparison, where the recognizing unit uses different potential operating state values in the data table to recognize a state of a second printer, where the second printer has operating states different than the first printer; and
   a controlling unit capable of controlling said first printer and said second printer through the parallel interface and parallel cable based on a recognition result obtained by said recognizing unit.

2. The printer control apparatus as claimed in claim 1, wherein contents of said data table are set in accordance with a command from an application program.

3. A printer control apparatus comprising:
   a data table storing operating state values of signal lines of a printer cable connected to a printer, corresponding to each of states in which said printer is to be maintained, wherein contents of said data table are set in accordance with a command from an application program;
   a recognizing unit comparing actual operating state values of the signal lines of the printer cable connected to said printer and the operating state values stored in said data table and recognizing a state of said printer based on a comparison result;
   a controlling unit controlling said printer based on a recognition result obtained by said recognizing unit;
   a storage unit storing relationships between identification information items identifying a plurality of printers and a plurality of sets of operating state values of signal lines to be connected to said plurality of printers, each sets of said plurality of operating state values corresponding to one of said plurality of printers; and
   a setting unit, when a printer is specified using a identification information item, for selecting a set of operating values corresponding to a printer specified using the identification information from among said plurality of sets of operating state values in said storage unit and setting the selected set of operating values in said data table.

4. The printer control apparatus as claimed in claim 1, wherein said printer is a printer based on a centronics interface standard.

5. The printer control apparatus as claimed in claim 3, wherein said plurality of printers are generally provided as printers based on a centronics interface standard.

6. The printer control apparatus as claimed in claim 3, wherein said setting unit sets the set of plurality of operating state values in accordance with a command from an application program.

7. A control program, stored in a computer readable medium, for controlling a first printer connected by signal lines of a printer cable using a data table storing potential operating state values, which can be externally changed, of the signal lines of the printer cable connected to both said first printer and a parallel interface, the state values corresponding to each of states in which said first printer is to be maintained, where a control program controls the first printer through the parallel interface and the parallel cable; said control program performing:
   recognizing, by comparing a set of actual operating state values of the signal lines of the parallel printer cable and read from the parallel interface, with a set of the potential operating state values stored in said data table, and recognizing a state of said first printer based on a result of the comparison, where the recognizing uses different potential operating state values in the data table to recognize a state of a second printer, where the second printer has operating states different than the first printer; and
   controlling said first printer and said second printer through the parallel interface and parallel cable based on recognition results obtained by said recognizing.

8. A control program, stored in a computer readable medium, for controlling a printer connected by signal lines of a printer cable using a data table storing operating state values, of the signal lines of the printer cable connected to said printer, corresponding to each of states in which said printer is to be maintained; said control program performing:
   recognizing by comparing actual operating state values of the signal lines of the printer cable connected to said printer and the operating state values stored in said data table and recognizing a state of said printer based on a comparison result;
   controlling said printer based on a recognition result obtained by said recognizing;
   a storage unit storing relationships between identification information items identifying a plurality of printers and a plurality of sets of operating state values of signal lines to be connected to said plurality of printers, each sets of said plurality of operating state values corresponding to one of said plurality of printers, said control program further performing; and
   selecting, when a printer is specified using a identification information item, set of operating values corresponding to a printer specified using the identification information from among said plurality of sets of operating state values in said storage unit and setting the selected set of operating values in said data table.

9. A printer control apparatus comprising:
   a data table storing operating state values, of signal lines connected to a printer, corresponding to each of states in which said printer is to be maintained;
   a recognizing unit comparing actual operating state values of the signal lines connected to said printer and the operating state values stored in said data table and recognizing a state of said printer based on a comparison result;

a controlling unit controlling said printer based on a recognition result obtained by said recognizing unit;

a storage unit storing relationships between identification information items identifying a plurality of printers and a plurality of sets of operating state values of signal lines to be connected to said plurality of printers, each sets of said plurality of operating state values corresponding to one of said plurality of printers; and a setting unit, when a printer is specified using a identification information item, for selecting a set of operating values corresponding to a printer specified using the identification information from among said plurality of sets of operating state values in said storage unit and setting the selected set of operating values in said data table.

10. The printer control apparatus as claimed in claim 9, wherein said plurality of printers are generally provided as printers based on a centronics interface standard.

11. The printer control apparatus as claimed in claim 9, wherein said setting unit sets the set of plurality of operating state values in accordance with a command from an application program.

12. A control program, stored in a computer readable medium, for controlling a printer connected by signal lines using a data table storing operating state values, of the signal lines connected to said printer, corresponding to each of states in which said printer is to be maintained; said control program comprising:

recognizing by comparing actual operating state values of the signal lines connected to said printer and the operating state values stored in said data table and recognizing a state of said printer based on a comparison result;

controlling said printer based on a recognition result obtained by said recognizing; and selecting, when a printer is specified using a identification information item, a set of operating values corresponding to a printer specified using the identification information from among said plurality of sets of operating state values in said storage unit and setting the selected set of operating values in said data table.

13. A method for controlling a first printer connected by signal lines using a data table storing potential operating state values, which can be externally changed, of the signal lines of a parallel printer cable connected to both said first printer and a parallel interface, the state values corresponding to each of states in which said first printer is to be maintained, where a control program controls the first printer through the parallel interface and the parallel cable; said method comprising:

comparing a set of actual operating state values of the signal lines of the parallel printer cable and read from the parallel interface, with a set of the potential operating state values stored in said data table, and recognizing a state of said first printer based on a result of the comparison, where the recognizing uses different potential operating state values in the data table to recognize a state of a second printer, where the second printer has operating states different than the first printer; and controlling said first printer and said second printer through the parallel interface and parallel cable based on recognition results obtained by said comparing.

* * * * *